US005127581A

United States Patent [19]

Kuwano et al.

[11] Patent Number: 5,127,581

[45] Date of Patent: Jul. 7, 1992

[54] FLUID JETTING PIPE

[75] Inventors: Michiyasu Kuwano, Fuchu; Giichi Iida, Tokyo; Kazunori Takahashi, Kawagoe, all of Japan

[73] Assignee: Kioritz Corporation, Tokyo, Japan

[21] Appl. No.: 644,651

[22] Filed: Jan. 23, 1991

[30] Foreign Application Priority Data

Jan. 24, 1990 [JP] Japan .................................. 2-012629
May 31, 1990 [JP] Japan ............................ 2-057570[U]

[51] Int. Cl.[5] .......................... F16L 55/00; E01H 5/04
[52] U.S. Cl. ...................................... 239/455; 239/451
[58] Field of Search ........... 239/455, 578, 537, 265.19, 239/451

[56] References Cited

U.S. PATENT DOCUMENTS

| | | | |
|---|---|---|---|
| 579,418 | 3/1897 | Bookwalter | 239/455 |
| 583,969 | 6/1897 | Askins | 239/455 |
| 935,745 | 10/1909 | Dodge | 239/455 |
| 1,627,250 | 5/1927 | Parker | 239/455 |
| 2,481,330 | 9/1949 | Neal | 239/265.19 |
| 2,959,359 | 11/1960 | Casaletto | 239/455 |
| 3,823,876 | 7/1974 | Hardy et al. | 239/511 |
| 4,070,771 | 1/1978 | Yakiwchuk . | |
| 4,097,722 | 6/1978 | Soler et al. | 239/455 |
| 4,132,507 | 2/1979 | Akiyama et al. . | |
| 4,232,454 | 11/1980 | Springer | 239/455 |
| 4,261,117 | 4/1981 | van der Peyl | 239/455 |
| 4,288,886 | 9/1981 | Siegler . | |
| 4,325,163 | 4/1982 | Mattson et al. . | |
| 4,402,106 | 9/1983 | Mattson . | |
| 4,413,371 | 11/1983 | Tuggle et al. . | |
| 4,674,146 | 6/1987 | Tuggle et al. . | |
| 4,870,714 | 10/1989 | Miner . | |

FOREIGN PATENT DOCUMENTS

| | | | |
|---|---|---|---|
| 0160477 | 11/1985 | European Pat. Off. | 239/455 |

*Primary Examiner*—Andres Kashnikow
*Assistant Examiner*—Karen B. Merritt
*Attorney, Agent, or Firm*—Browdy and Neimark

[57] ABSTRACT

A fluid jetting pipe for discharging fluid jets. Variable outlet members are disposed at an outlet end of the jetting pipe such that the outlet opening area through which the fluid jets are allowed to discharge from the jetting pipe is fully opened in a normal state and can be narrowed down on demand.

1 Claim, 6 Drawing Sheets

FLUID JETTING PIPE

BACKGROUND OF THE INVENTION

The present invention relates to a fluid jetting pipe capable of changing the outlet opening area as required, and more particularly to a structure suitable for chemical jetting pipes of powered chemicals sprayers and blast jetting pipes of blow cleaners.

Fluid jetting pipes, especially jetting pipes of powered blow cleaners, are sometimes required to provide discharge jets at a relatively large air (wind) flow rate in such a case as moving a great deal of light dust at a time, and are sometimes required to provide forceful and strong discharge jets at a relatively high air pressure in such a case as blowing off stuck dust, small stones or the like. There has thus been desired a jetting pipe which is arranged to be capable of easily providing discharge jets at different air flow rates and pressures during periods of machine use dependent on working conditions and/or places. However, a conventional jetting pipe is in itself arranged not to be capable of changing the outlet opening area, i.e., to have the fixed outlet opening area. In other words, for providing discharge jets at various air flow rates and pressures, the conventional jetting pipe must be replaced with another type one, or a blower output must be adjusted on demand. This arrangement has suffered from the disadvantages that the raised air pressure would increase the useless air flow rate, and the enhanced output of the blower would increase noise.

SUMMARY OF THE INVENTION

It is therefore an object of the present invention to eliminate the above-mentioned disadvantages in the prior art, and to provide a jetting pipe which can easily and steplessly adjust an available flow rate or pressure of discharge jets as required, and can also suppress the occurrence of large noise, with a relatively simple structure.

Specifically, according to the present invention, a fluid jetting pipe for discharging fluid jets is featured in that variable outlet members are disposed at an outlet end of the jetting pipe such that the outlet opening area through which the fluid jets are allowed to discharge from the jetting pipe is fully opened in a normal state and can be narrowed down on demand.

There is thus provided the fluid jetting pipe with which the outlet opening area can be narrowed down from a fully opened state on demand through movement of the variable outlet members; an available flow rate or pressure of the discharge jets from the jetting pipe can be adjusted as required; the simplified structure and easy handling are achieved; and the occurrence of noise is minimized.

According to another aspect of the present invention, a fluid jetting pipe for discharging fluid jets is featured in that a plurality of variable outlet members each extending forwardly in the axial direction are disposed in facing relation to each other at an outlet end of the jetting pipe, at least one of the variable outlet members is pivotally attached to the outlet end for permitting relative pivotal movements of the variable outlet members, a spring is interposed between the plurality of variable outlet members to bias the variable outlet members away from each other by its resilient force, and a control member is fixed at its one end to an intermediate portion of the spring for pivotally opening and closing the variable outlet members.

There is thus provided the fluid jetting pipe with which the outlet opening area of the jetting pipe can be easily adjusted by operating the control member to pivotally turn at least one variable outlet member; discharge jets can be produced at a desired flow rate or pressure; the simplified structure and easy handling are achieved; and the occurrence of noise is minimized.

PREFERRED EMBODIMENTS OF THE INVENTION

Figure 1:
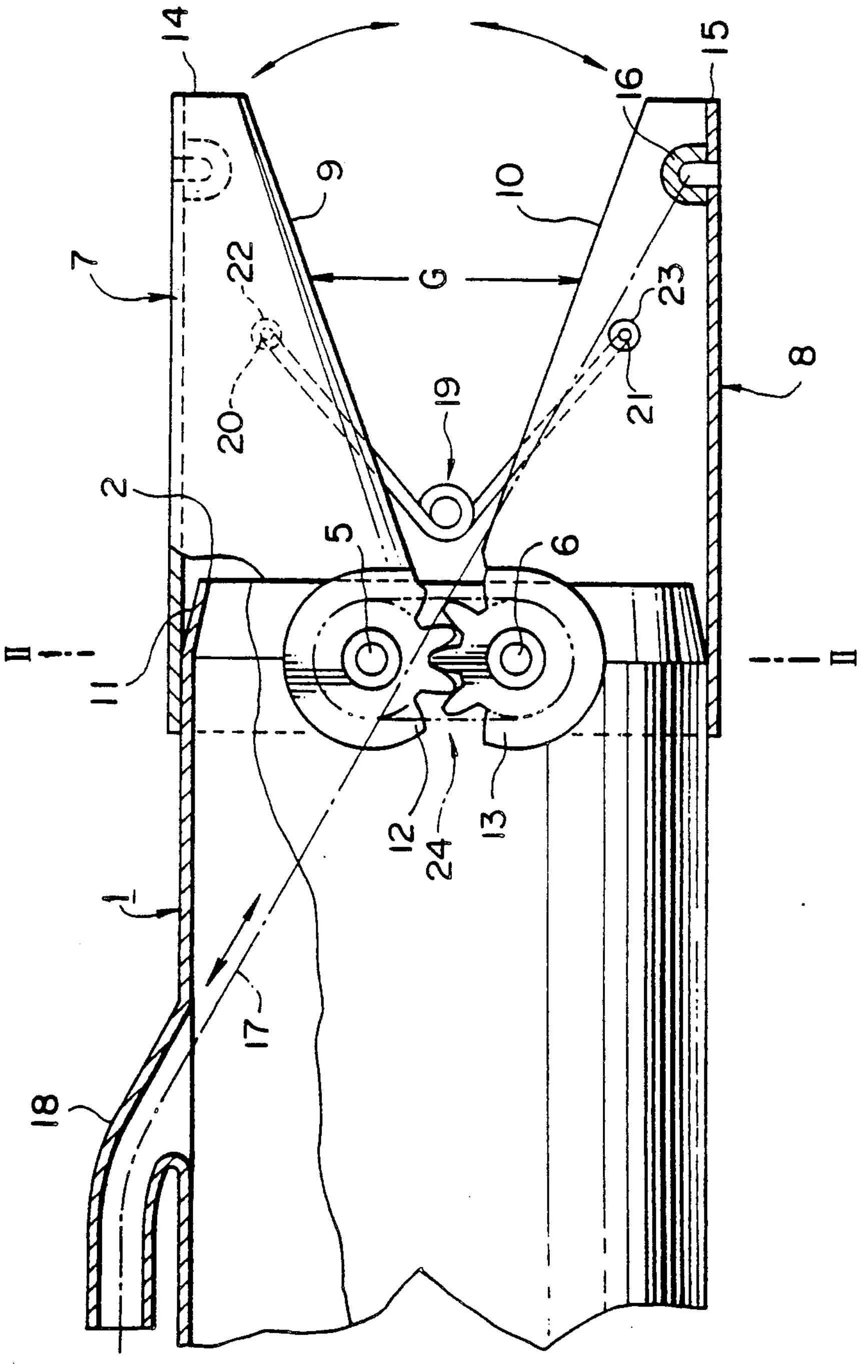
FIG. 1 is a partially broken side view of principal parts of a jetting pipe, showing one embodiment of the present invention.

Hereinafter, the present invention will be described in conjunction with preferred embodiments shown in the drawings.

Figure 2:
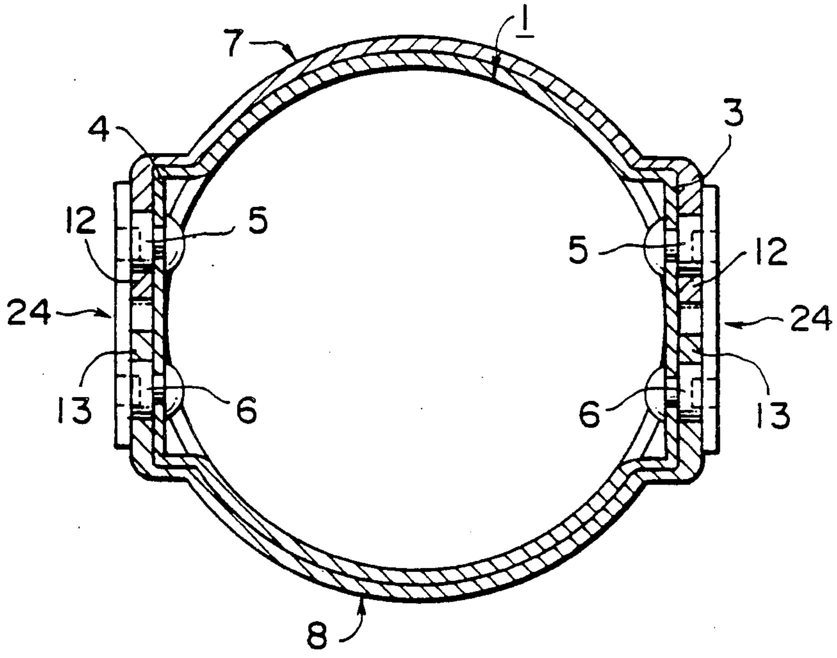
FIG. 2 is a sectional view taken along line II—II in FIG. 1.

A jetting pipe 1 in an illustrated one embodiment is especially suitable for use as jetting pipes for powered blow cleaners. The jetting pipe 1 is molded as a one-piece component using appropriate synthetic resin material and, as shown in FIGS. 1 and 2, is formed into a relatively long shape having a nearly cylindrical cross-section. The jetting pipe 1 is also integrally formed on opposite lateral sides near its outlet end 2 with a pair of flat surface portions 3 and 4 which are extended substantially parallel to each other in the vertical direction as viewed on FIG. 2. To each of the flat surface portions 3 and 4, there is attached a holder member 24 from the outside which has a pair of pins 5 and 6 vertically spaced from each other and penetrating through both the jetting pipe 1 and a variable outlet member 7 or 8 as described later. The pair of upper pins 5 support a downwardly-opened semicylindrical variable outlet member 7 at its opposite lateral sides in a vertically pivotable manner, whereas the pair of lower pins 6 support an upwardly-opened semicylindrical variable member 8 at its opposite lateral sides in a vertically pivotable manner. These variable outlet members 7 and 8 are each disposed in contact with the outer peripheral surface of the jetting pipe 1 and projected forwardly from the outlet end 2 in the axial direction. Lower opposite edges 9 of the upper variable outlet member 7 are dispose in facing relation to upper opposite edges 10 of the lower variable outlet member 8. In addition, these edges 9 and 10 are formed to extend on respective inclined surfaces such that a gap G defined therebetween is gradually increased or widened toward their distal ends in the axial direction. It is thus understood that the variable outlet members 7 and 8 are both formed into the same shape and arranged in facing relation to each other. Further, the jetting pipe 1 is formed in the outer peripheral surface of the outlet end 2 with a chamfered portion 11 inwardly inclined in the radial direction, for thereby allowing the variable outlet members 7 and 8 to easily pivot or turn as described later.

Figure 4:
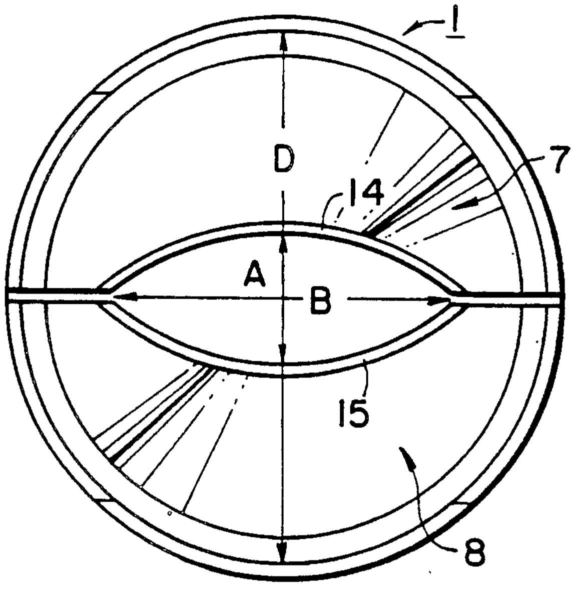
FIG. 4 is an end view of a variable outlet member section of the jetting pipe of FIG. 3 as viewed in the axial direction from the front side.
Figure 3:
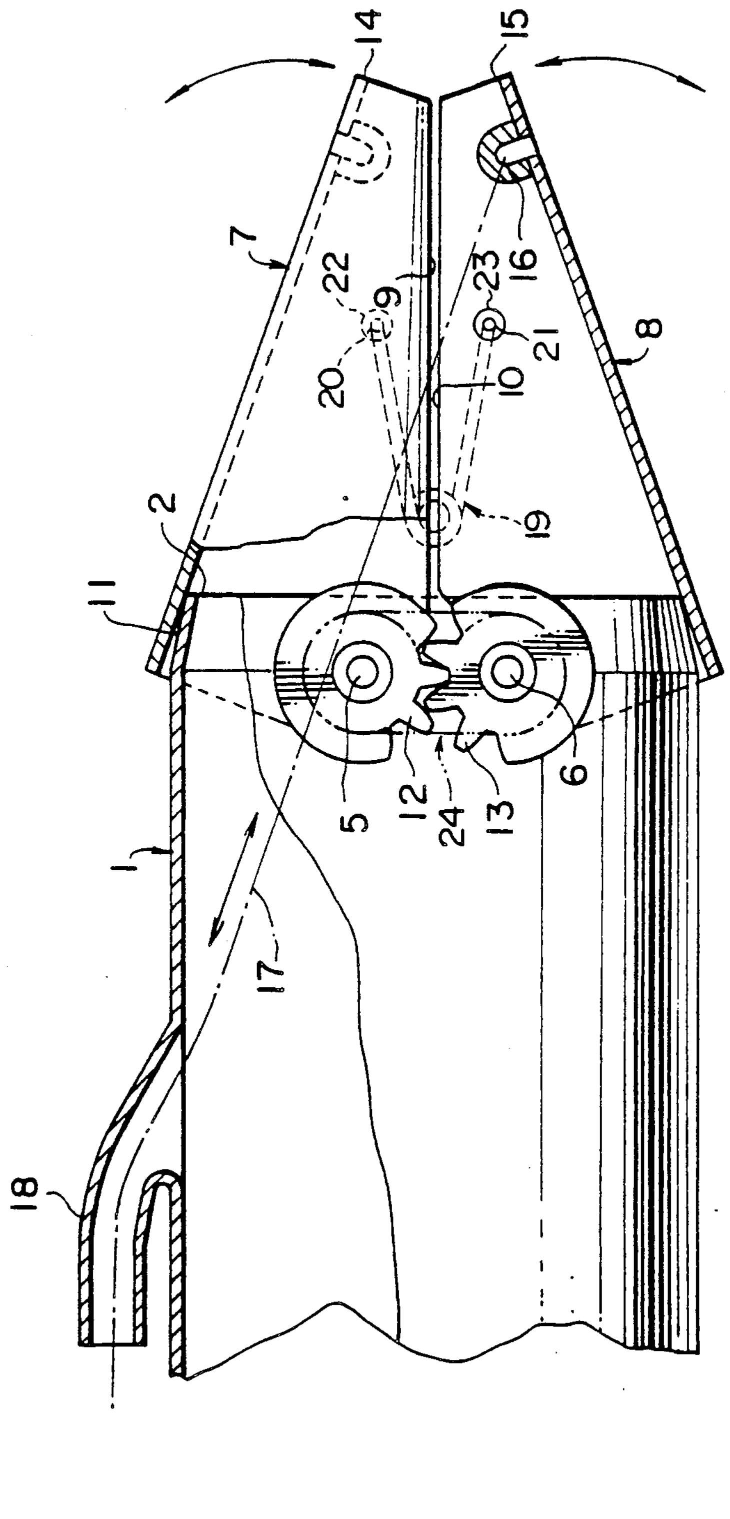
FIG. 3 is a side view of the principal parts of the jetting pipe of FIG. 1 in a different operated state.

Gears 12 and 13 are rotatably supported to the pins 5 and 6 of the flat surface portions 3 and 4, respectively, and are integrally molded with the variable outlet members 7 and 8, respectively, to be capable of meshing with each other. Therefore, when the upper variable member 7 is turned downwardly from a fully open position shown in FIG. 1 to a fully closed position shown in FIG. 3, the lower variable member 8 is turned at the same time upwardly from a fully open position shown in FIG. 1 to a fully closed position shown in FIG. 3 through the meshing of the gears 12 and 13. In other words, the gears 12 and 13 jointly serve as a linkage unit for simultaneously turning both the variable outlet members 7 and 8 in opposite directions. A torsion spring 19 has its opposite ends 20 and 21 which are hooked into hooking holes 22 and 23 formed in the variable outlet members 7 and 8, respectively, for normally holding both the variable outlet members 7 and 8 in the fully open positions shown in FIG. 1. When the variable outlet members 7 and 8 are both in the fully open positions shown in FIG. 1, their distal ends 14 and 15 define the maximum jet outlet opening area with the diameter D (see FIG. 4) substantially equal to the cross-sectional area of the outlet end 2 of the jetting pipe 1. When the variable outlet members 7 and 8 are both in the fully closed positions shown in FIG. 3, their edges 9 and 10 are approached to nearly contact with each other so that their distal ends 14 and 15 define the minimum jet outlet opening area of substantially elliptic shape with a vertical length A and a horizontal length B as shown in FIG. 4.

A cable fixing portion 16 is provided on the inner surface of the lower variable outlet member 8 near the distal end 15 thereof, and a cable 17 has its front end fixed to the cable fixing portion 16. The cable 17 is obliquely extended through the jetting pipe 1 toward the rear and upper side, and then further rearwardly extended outside the jetting pipe 1 through a cable guide passage 18 formed on the upper side of the jetting pipe 1. The rear end of the cable 17 is coupled to a lever (not shown) provided at an appropriate position in the rear portion of the jetting pipe 1 and actuated by an operator. During periods of machine use, the operator turns the operator-actuatable lever to pull the cable 17, whereby the variable outlet members 7 and 8 can be instantaneously turned from the fully open positions shown in FIG. 1 to the fully closed positions shown in FIG. 3. Further, by restoring the lever to appropriately loosen the cable 17, the variable outlet members 7 and 8 can be opened at once by a resilient urging force of the torsion spring 19 to be adjusted to an intermediate state between the fully open positions shown in FIG. 1 to the fully closed positions shown in FIG. 3 dependent on a loosened extent of the cable 17. It is thus possible to maintain the jet outlet opening area of the jetting pipe 1 at a desired size for providing discharge jets with desired air flow rate and pressure. Note that the gears 12 and 13 may be provided on only one flat surface portion 3 or 4, and that the gears 12 and 13 may be replaced with any other mechanism, such as a cam mechanism, which functions in a like manner.

In addition, the variable outlet member can also be modified and practiced in various forms. For example, it may be a combination of smaller split pieces, or may be formed of a rubber tube which can be deformed or narrow down for adjustment of the jet outlet opening area.

Figure 5:
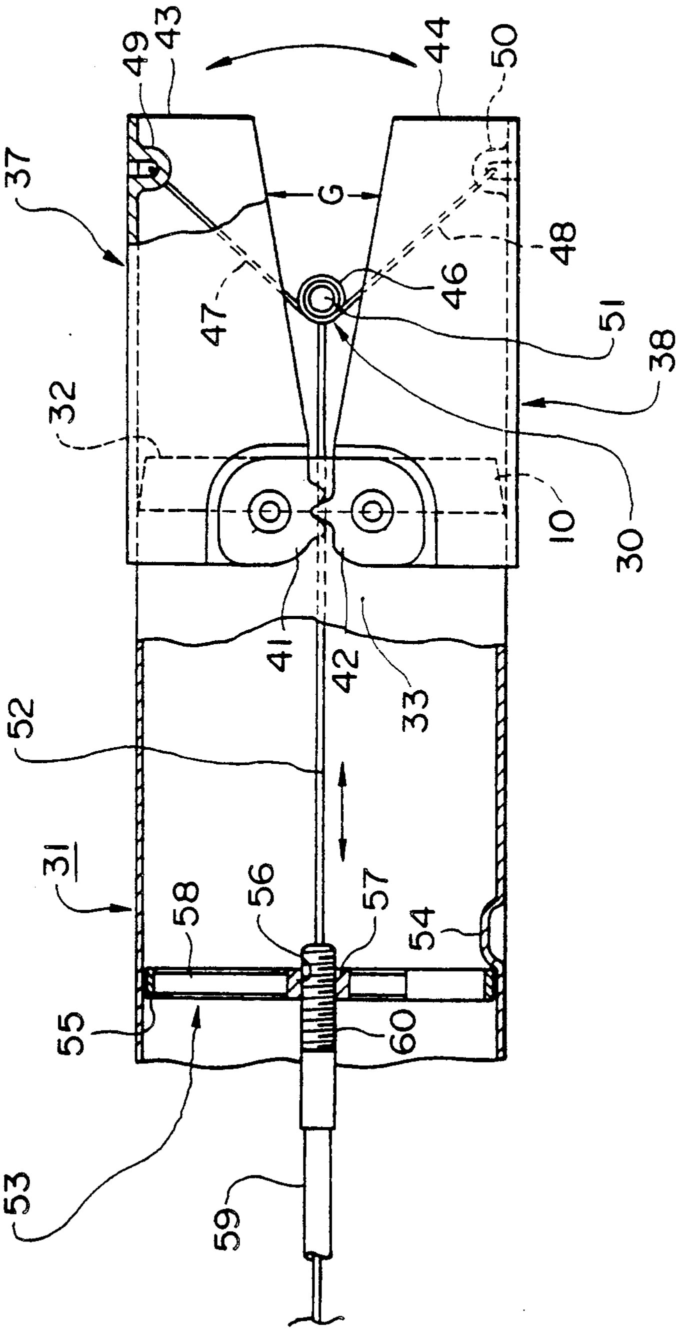
FIG. 5 is a partially broken side view of principal parts of a jetting pipe, showing another embodiment of the present invention.
Figure 6:
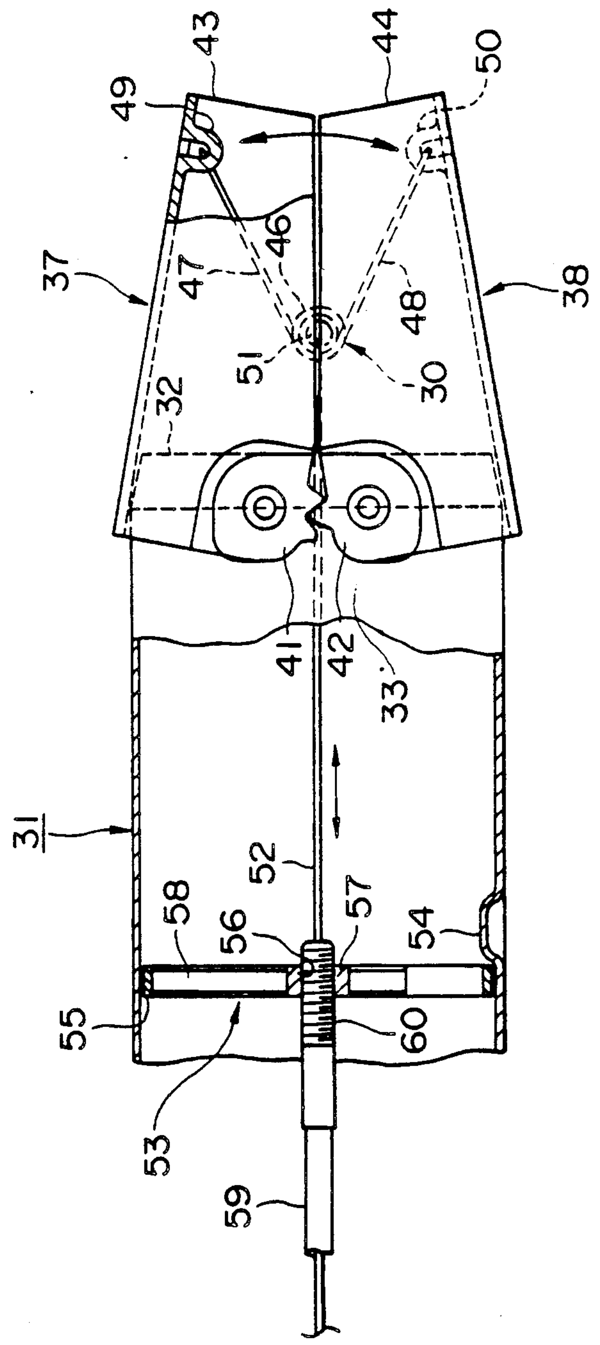
FIG. 6 is a partially broken side view of the principal parts of the jetting pipe of FIG. 5 in a different operated state.
Figure 7:
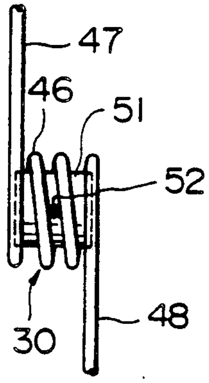
FIG. 7 is a front view of principal parts including a spring used in the embodiment of FIG. 5.

FIGS. 5 through 7 show another embodiment in which variable outlet members, gears and others are similar in arrangement and operation to those in the above embodiment, hence they will not be described here.

A torsion spring 30 is disposed in an inner space between upper and lower variable outlet members 37 and 38. As shown in FIG. 7, the torsion spring 30 comprises an intermediate portion 46 wound into the form of a coil in the appropriate number of turns, and a pair of arm portions 47 and 48 extending from the intermediate portion 46 toward the upper and lower variable outlet members 37 and 38, respectively. The upper and lower variable outlet members 37 and 38 are integrally provided on the inner surface near the distal ends 43 and 44 thereof with spring hooking portions 49 and 50, respectively. These spring hooking portions 49 and 50 support or hook respective tip ends of the arm portions 47 and 48 of the torsion spring 30 in a pivotal manner. With such an arrangement, resilient force of the torsion spring 30 serves to bias the upper and lower variable outlet members 37 and 38 apart away from each other for maintaining both the members their fully open positions, i.e., the maximum jet outlet opening positions, shown in FIG. 5. At this time, the upper and lower variable outlet members 37 and 38 are brought at their rear ends into contact with the outer peripheral surface of a jetting pipe 31 so that they are prevented from further turning in the opening direction.

Figure 8:
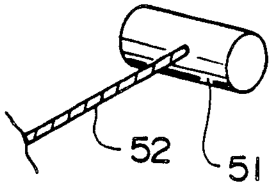
FIG. 8 is a perspective view of the end portion of a control member.

Within an inner space of the coil-like intermediate portion 46 of the torsion spring 30, there is inserted an engagement member 51 having a cylindrical shape, as shown in FIG. 8. Fixed to the peripheral surface of the engagement member 51 is fixed one end of a flexible cable 52, as a control member, which comprises interior strings of a Bowden cable. The cable 52 is extended from the engagement member 51 toward the inside of the jetting pipe 31 through a gap between two adjacent turns of the torsion spring 30 in its intermediate portion 46.

Moreover, a wheel-like member 53 is disposed in the jetting pipe 31. The wheel-like member 53 comprises a peripheral edge 55 press-fitted to the inner peripheral surface of the jetting pipe 31 and engaged with an inner projection 54 formed on the inner peripheral surface of the jetting pipe 31 so that it is attached to the inner peripheral surface of the jetting pipe 31 to be held immobile in place, a boss 57 having a threaded hole 56 axially bored at the center, and a plurality of spokes 58 radially extending between the peripheral edge 55 and the boss 57. The boss 57 and the spokes 58 are shaped and arranged in such a manner as not to essentially impede smooth air flow passing through the jetting pipe 31. A threaded portion 60 of the Bowden cable formed at the distal end of its outer sleeve 59 is fixedly screwed into the threaded hole 56 of the boss 57. The outer sleeve 59 is, though not shown, arranged so as to extend through a wall of the jetting pipe 31 at an appropriate position and project toward the exterior. The flexible cable 52 is passed through the outer sleeve 59 and then led to the exterior of the jetting pipe 31 by being guided by the outer sleeve 59. The outer end of the flexible cable 52 is secured to a control lever provided on a grip (not shown) at which the operator holds the jetting pipe 3.

With the above arrangement, when the operator actuates the control lever during periods of machine use to adjust an extent of pulling the cable 52, the variable outlet members 37 and 38 are pivotally turned between maximum jet outlet opening positions shown in FIG. 5 and minimum jet outlet opening positions shown in FIG. 6. By holding the variable outlet members 37 and 38 at desired intermediate positions, the jet outlet opening area of the jetting pipe 31 can be maintained at a desired size for providing discharge jets with desired air flow rate and pressure. In addition, with this illustrated embodiment, because the resilient force of the torsion spring 30 and the pulling force of the cable 52 each act on both of the upper and lower symmetrically and uniformly, the variable outlet members 37 and 38 will not be subjected to any unsatisfactory or imbalanced forces. In this embodiment, too, gears 41 and 42 may be provided on only one flat surface portion 33, and the gears 41 and 42 may be replaced with any other mechanism, such as a cam mechanism, which functions in a like manner.

This embodiment can also be modified and practiced in various forms. For example, one of the variable outlet members 37 and 38 may be integrally molded with an outlet end 32 of the jetting pipe 31 for simplification. Alternatively, each variable outlet member may be comprised of two or more smaller split pieces.

What is claimed is:

1. A fluid jetting pipe for discharging fluid jets comprising variable outlet members disposed at an outlet end of said jetting pipe such that an outlet opening area through which the fluid jets are allowed to discharge from said jetting pipe is fully opened in a normal state and can be narrowed down on demand wherein each of said variable outlet members has a gear fixed theroen and meshing each other, a torsion spring having opposite ends thereof is interposed between said variable outlet members to bias said variable outlet members away from each other by its resilient force, and a control cable is connected at one end thereof to an intermediate portion of said spring for pivotally opening and closing said variable outlet members.

* * * * *